United States Patent
Shiroshita

(10) Patent No.: US 11,528,054 B2
(45) Date of Patent: Dec. 13, 2022

(54) RECEPTION DEVICE AND COMMUNICATION SYSTEM

(71) Applicant: SONY SEMICONDUCTOR SOLUTIONS CORPORATION, Kanagawa (JP)

(72) Inventor: Hiroshi Shiroshita, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 17/052,632

(22) PCT Filed: Mar. 29, 2019

(86) PCT No.: PCT/JP2019/014070
§ 371 (c)(1),
(2) Date: Nov. 3, 2020

(87) PCT Pub. No.: WO2019/220790
PCT Pub. Date: Nov. 21, 2019

(65) Prior Publication Data
US 2021/0184726 A1 Jun. 17, 2021

(30) Foreign Application Priority Data
May 15, 2018 (JP) .............................. JP2018-093857

(51) Int. Cl.
*H04B 3/10* (2006.01)
*H04L 25/03* (2006.01)

(52) U.S. Cl.
CPC ......... *H04B 3/10* (2013.01); *H04L 25/03012* (2013.01); *H04L 25/03267* (2013.01); *H04L 25/03949* (2013.01)

(58) Field of Classification Search
CPC ......... H04L 25/03012; H04L 25/03267; H04L 25/03949
See application file for complete search history.

(56) References Cited

U.S. PATENT DOCUMENTS 4,759,035 A * 7/1988 McGary ............... H04L 25/062
333/18
5,271,037 A 12/1993 Szechenyi
(Continued)

FOREIGN PATENT DOCUMENTS

CN 1965497 A 5/2007
CN 105612724 A 5/2016
(Continued)

OTHER PUBLICATIONS

International Search Report and Written Opinion of PCT Application No. PCT/JP2019/014070, dated Jun. 18, 2019, 07 pages of ISRWO.

*Primary Examiner* — Natasha W Cosme
(74) *Attorney, Agent, or Firm* — Chip Law Group

(57) ABSTRACT

Providing a reception device and a communication system capable of preventing signal quality degradation and improving signal transmission efficiency in a case where a data signal is transmitted via a transmission line that connects a plurality of transmission devices and a reception device. Provided is a reception device including a compensation circuit and an adjustment circuit. The compensation circuit is connected to a transmission line connected to each of the plurality of transmission devices and compensates a signal transmitted from each of the transmission devices in time division. The adjustment circuit adjusts operation of the compensation circuit, in which the adjustment circuit adjusts the operation of the compensation circuit by using a first adjustment value that adjusts the operation of the compen- (Continued)

sation circuit and is read from a recording medium storing the first adjustment value.

10 Claims, 9 Drawing Sheets

(56) References Cited

U.S. PATENT DOCUMENTS

| | | | |
|---|---|---|---|
| 2005/0281343 | A1 | 12/2005 | Hsu et al. |
| 2007/0098058 | A1 | 5/2007 | Frisch |
| 2010/0271972 | A1* | 10/2010 | Fujii ............... H04B 3/145 |
| | | | 370/252 |
| 2014/0281753 | A1 | 9/2014 | Wagh et al. |
| 2015/0288458 | A1* | 10/2015 | Honda ............. H04J 14/02 |
| | | | 398/81 |

FOREIGN PATENT DOCUMENTS

| | | |
|---|---|---|
| JP | 2003-101444 A | 4/2003 |
| JP | 2008-503929 A | 2/2008 |

\* cited by examiner

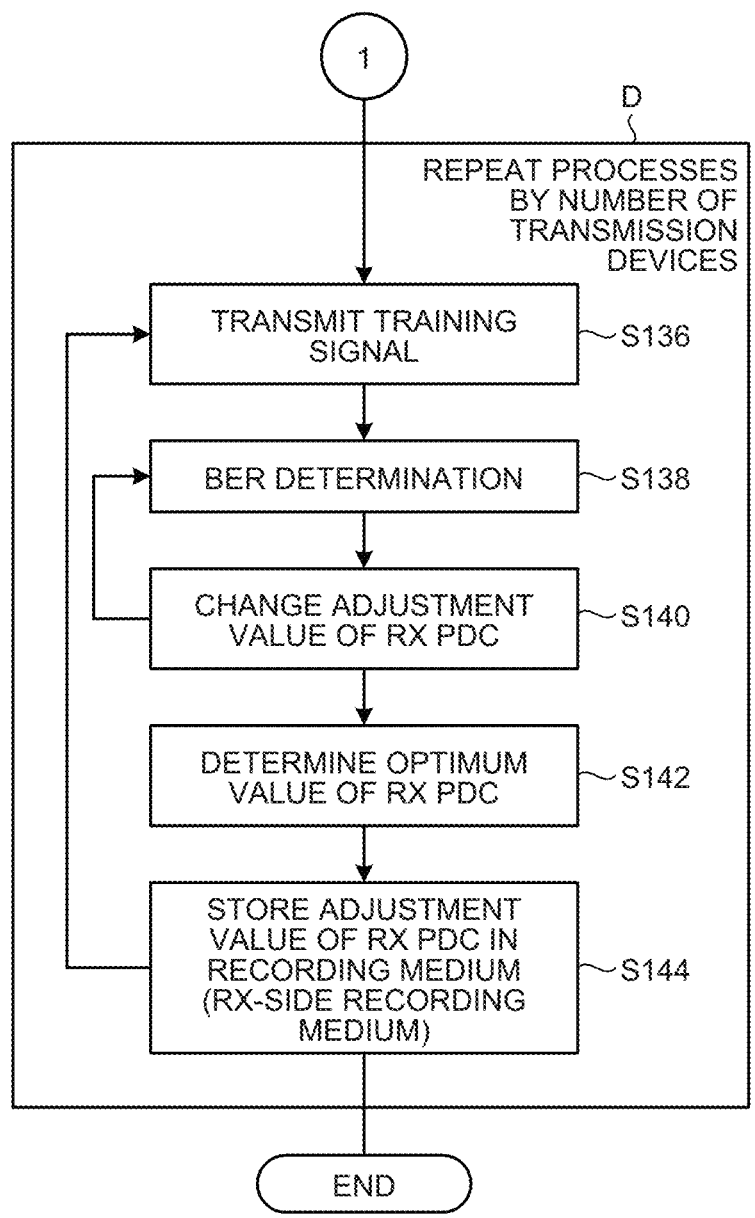

RECEPTION DEVICE AND COMMUNICATION SYSTEM

CROSS REFERENCE TO RELATED APPLICATIONS

This application is a U.S. National Phase of International Patent Application No. PCT/JP2019/014070 filed on Mar. 29, 2019, which claims priority benefit of Japanese Patent Application No. JP 2018-093857 filed in the Japan Patent Office on May 15, 2018. Each of the above-referenced applications is hereby incorporated herein by reference in its entirety.

FIELD

The present disclosure relates to a reception device and a communication system.

BACKGROUND

Technologies related to inter-device connections, such as a connection between a processor and a sensor, have been developed. Examples of the technology related to the inter-device connections include the technology described in Patent Literature 1 below.

CITATION LIST

Patent Literature

Patent Literature 1: U.S. Patent Application Publication No. 2014/0281753

SUMMARY

Technical Problem

Examples of a configuration to connect a transmission device and a reception device via a transmission line include a configuration in which the transmission device and the reception device are connected on a one-to-one basis via a transmission line (so-called point-to-point connection configuration). An example of a standard related to a configuration in which a transmission device and a reception device are connected on a one-to-one basis via a transmission line is Camera Serial Interface 2 (CSI-2) standard of the Mobile Industry Processor Interface (MIPI) Alliance.

In the case of connecting each of a plurality of transmission devices and one reception device via a transmission line using a configuration of connecting the transmission device and the reception device via a transmission line on a one-to-one basis, the number of transmission lines needed to be connected to the reception device would be the number of transmission devices.

Meanwhile, there is another configuration to connect a transmission device and a reception device via a transmission line, in which a plurality of transmission devices and one reception device are connected to a transmission line, and a data signal is transmitted in time division (hereinafter, referred to as "a multipoint bus"). Using a multipoint bus to connect a plurality of transmission devices and one reception device with transmission lines would make it possible to reduce the number of transmission lines connected to the reception device to be less than the number of transmission devices.

Here, in a case where a data signal is transmitted using a multipoint bus, the transmission path impedance and the delay amount between individual transmission devices and the reception device would be mutually different. Therefore, in a case where a data signal is transmitted using a multipoint bus, it is ordinary to perform an operation of "adjusting an adjustment amount in a compensation circuit such as an equalizer provided in a reception device in accordance with the transmission device that transmits the data signal every time the transmission device to transmit the data signal is switched". As described above, by "adjusting the compensation circuit in accordance with the transmission device that transmits the data signal", it is possible to prevent signal quality degradation due to the difference in the transmission path impedance and the delay amount between the transmission device and the reception device.

However, in a case where the amount of adjustment in the compensation circuit is adjusted in the reception device each time the transmission device that transmits the data signal is switched, switching the transmission device that transmits the data signal would take much time, leading to reduction of the total bandwidth usable for signal transmission in a certain period.

The present disclosure proposes a novel and improved reception device and communication system capable of preventing signal quality degradation and improving signal transmission efficiency in a case where a data signal is transmitted via a transmission line that connects a plurality of transmission devices and a reception device.

Solution to Problem

According to the present disclosure, a reception device is provided. The reception device includes a compensation circuit connected to a transmission line connected to each of a plurality of transmission devices and configured to compensate a signal transmitted from each of the transmission devices in time division and an adjustment circuit configured to adjust operation of the compensation circuit, wherein the adjustment circuit adjusts the operation of the compensation circuit by using a first adjustment value that adjusts the operation of the compensation circuit and is read from a recording medium storing the first adjustment value.

Moreover, according to the present disclosure, a communication system is provided. The communication system includes a plurality of transmission devices each connected to a transmission line and a reception device connected to the transmission line and configured to receive a signal transmitted from each of the transmission devices, wherein the reception device includes a compensation circuit connected to the transmission line and configured to compensate a signal transmitted from each of the transmission devices in time division and an adjustment circuit configured to adjust operation of the compensation circuit, and the adjustment circuit adjusts the operation of the compensation circuit by using a first adjustment value that adjusts the operation of the compensation circuit and is read from a recording medium storing the first adjustment value.

Advantageous Effects of Invention

According to the present disclosure, it is possible to prevent signal quality degradation and improve signal transmission efficiency in a case where a data signal is transmitted via a transmission line that connects a plurality of transmission devices and a reception device.

Note that the above effects are not necessarily limited, and it is possible to obtain any of effects described in this specification or other effects that can be detected from this specification together with or instead of the above effects.

BRIEF DESCRIPTION OF DRAWINGS

FIG. 8B is a flowchart illustrating an example of a process in the communication system according to the present embodiment.

DESCRIPTION OF EMBODIMENTS

Hereinafter, preferred embodiments of the present disclosure will be described in detail with reference to the accompanying drawings. Note that in the present specification and drawings, components having substantially the same functional configuration will be denoted by the same reference signs, and a redundant description thereof will be omitted.

Moreover, description will be given in the following order.

1. Communication system according to the present embodiment

[1] Degradation in signal transmission efficiency that occurs in a communication system using an existing multi-point bus

[2] Method for improving signal transmission efficiency in the communication system according to the present embodiment

[3] Example of a configuration of the reception device according to the present embodiment

[4] Example of a process in the communication system according to the present embodiment

[5] Example of effects obtained by using the communication system including the reception device according to the present embodiment

[6] Application example of communication system, transmission device, and reception device according to the present embodiment In the following, a transmission device will be referred to as "TX" and a reception device will be referred to as "RX" in some cases.

(Communication System According to the Present Embodiment)

Figure 1:
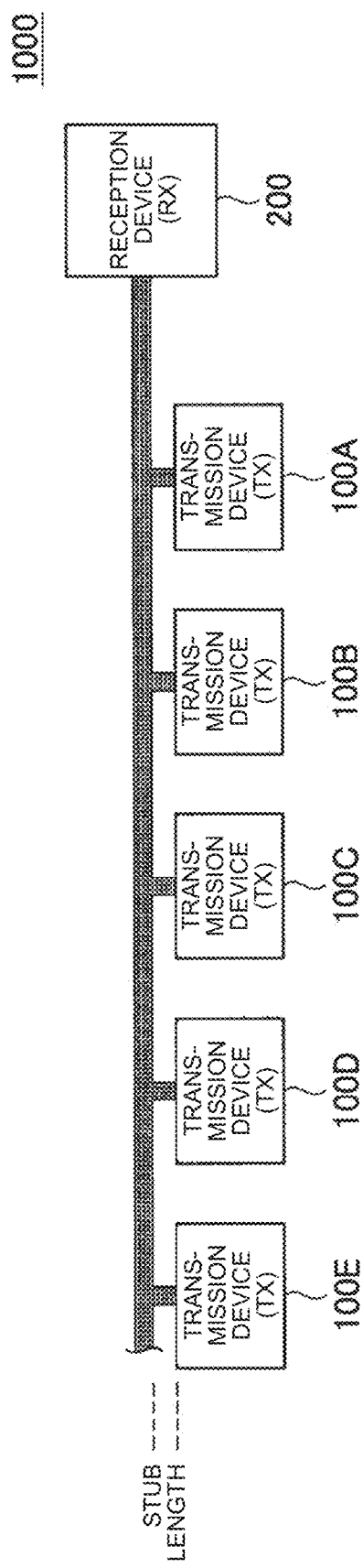
FIG. 1 is a diagram illustrating a configuration example of a communication system according to the present embodiment.

FIG. 1 is a diagram illustrating a configuration example of a communication system 1000 according to the present embodiment.

Examples of the communication system 1000 include a drone (device which can be operated remotely or autonomously) and a mobile body such as an automobile. Note that the application example of the communication system 1000 is not limited to the above example. Other application examples of the communication system 1000 will be described below.

The communication system 1000 includes transmission devices 100A, 100B, 100C, 100D, 100E, . . . and one reception device 200, for example. Each of the transmission devices 100A, 100B, 100C, 100D, 100E, . . . and the reception device 200 drive on the power supplied from an internal power source (not illustrated) such as a battery included in the communication system 1000 or on the power supplied from an external power source of the communication system 1000. Hereinafter, the transmission devices 100A, 100B, 100C, 100D, 100E, . . . are collectively referred to as "the transmission device 100" or one of the transmission devices 100A, 100B, 100C, 100D, 100E, . . . is referred to "the transmission device 100" in some cases.

Although FIG. 1 illustrates the communication system 1000 having five or more transmission devices 100, the number of transmission devices included in the communication system according to the present embodiment is not limited to the example illustrated in FIG. 1. For example, the communication system according to the present embodiment may include any number of transmission devices 100 as long as the number is two or more.

Each of the plurality of transmission devices 100 and the reception device 200 is electrically connected via one transmission line. The transmission line is a single signal transmission path that connects each of the transmission devices 100 and the reception devices 200. For example, a data signal is transmitted from each of the transmission devices 100 in time division, whereby the data signal is transmitted from each of the transmission devices 100 to the reception device 200 via the transmission line. That is, a transmission line is a multipoint bus that connects each of the plurality of transmission devices 100 and the reception device 200.

The transmission device 100 is a device having at least a function of transmitting a data signal via a transmission path. Furthermore, the transmission device 100 may include a device such as a sensor device according to an application example of the transmission device of the present embodiment to be described below and may have a function according to an application example of the transmission device of the present embodiment to be described below. Here, examples of the sensor device according to the present embodiment include an imaging device such as a digital still camera, a digital video camera, and a stereo camera, an infrared sensor, a distance image sensor, or the like. When the sensor device as described above is included, the transmission device 100 functions as an image sensor.

The following will describe an exemplary case where the transmission device 100 functions as an image sensor and transmits image data as a data signal.

The reception device 200 is a device having at least a function of receiving a data signal via the transmission path. Furthermore, the reception device 200 may have a function according to an application example of the reception device according to the present embodiment, which will be described below. An example of the configuration of the reception device 200 will be described below.

[1] Degradation in Signal Transmission Efficiency that Occurs in a Communication System Using an Existing Multipoint Bus Prior to the description of a method for improving the signal transmission efficiency in the communication system 1000, a description of degradation in the signal transmission efficiency that occurs in a communication system using an existing multipoint bus will be given. Note that the expression "a communication system using an existing multipoint bus" does not indicate that "a communication system using an existing multipoint bus exemplified below actually exists". Hereinafter, for convenience of explanation, it is assumed that a communication system using an existing multipoint bus has a configuration similar to the communication system 1000 illustrated in FIG. 1.

In a case where a data signal is transmitted using a multipoint bus, individual transmission devices transmit data signals in time division in order to avoid collision of data output from each of the plurality of transmission devices. That is, in a case where a multipoint bus is used, individual transmission devices transmit data signals at mutually different timings.

Furthermore, as described above, in a case where data signals are transmitted using a multipoint bus, there is a difference in the transmission path impedance and the delay amount between individual transmission devices and the reception device.

Therefore, in a communication system using an existing multipoint bus, a training signal and a data signal are transmitted every time the transmission device that transmits the data signal is switched. That is, the transmission device included in the communication system using an existing multipoint bus transmits the training signal every time the data signal is transmitted.

Figure 2:
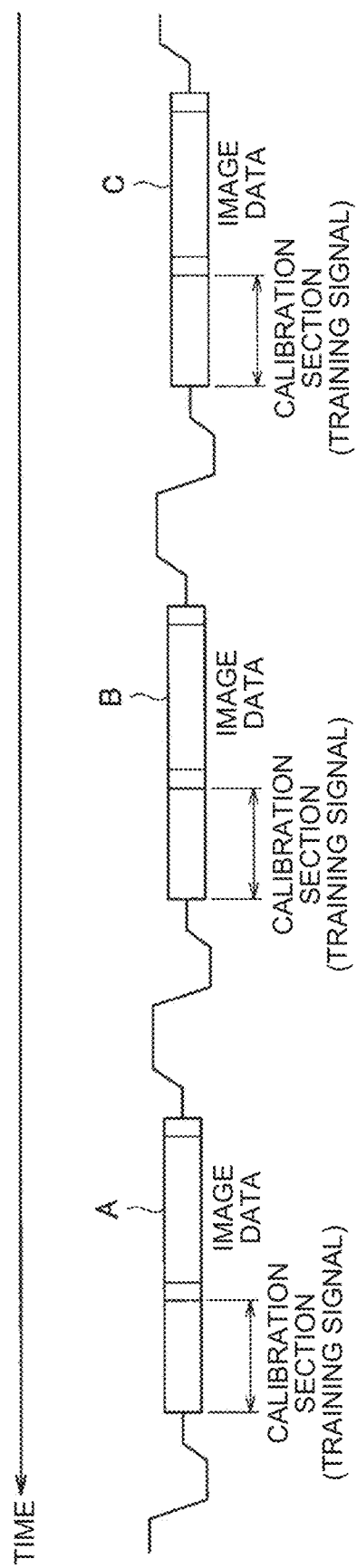
FIG. 2 is a diagram illustrating an example of signals transmitted in a communication system using an existing multipoint bus.

FIG. 2 is a diagram illustrating an example of signals transmitted in a communication system using an existing multipoint bus. The sign A illustrated in FIG. 2 illustrates an example of a signal transmitted by a transmission device connected to the position similar to the transmission device 100A illustrated in FIG. 1, for example. The sign B illustrated in FIG. 2 illustrates an example of a signal transmitted by a transmission device connected to the position similar to the transmission device 100B illustrated in FIG. 1, for example. The sign C illustrated in FIG. 2 illustrates an example of a signal transmitted by a transmission device connected to the position similar to the transmission device 100C illustrated in FIG. 1, for example. FIG. 2 illustrates an example in which each of the transmission devices included in the communication system using an existing multipoint bus transmits a signal indicating image data as a data signal.

As illustrated in FIG. 2, in a communication system using an existing multipoint bus, each of the transmission devices transmits a training signal and a data signal in time division.

In addition, in a communication system using an existing multipoint bus, a reception device calibrates a compensation circuit (to be described below) using the received training signal every time the training signal is received, so as to process the data signal received after the calibration.

Figure 3:
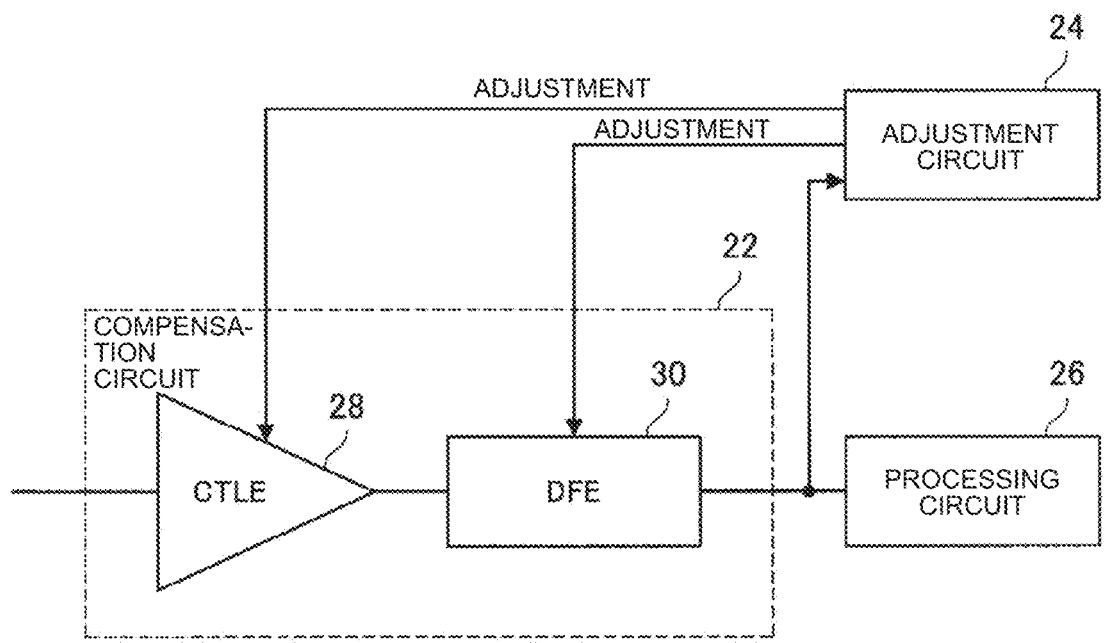
FIG. 3 is a block diagram illustrating an example of a configuration of a reception device included in a communication system using an existing multipoint bus.

FIG. 3 is a block diagram illustrating an example of a configuration of a reception device 20 included in a communication system using an existing multipoint bus. The reception device 20 includes a compensation circuit 22, an adjustment circuit 24, and a processing circuit 26, for example.

The compensation circuit 22 is a circuit having a function of compensating a received signal. The compensation circuit 22 includes a Continuous Time Linear Equalizer (CTLE) 28 and a Decision Feedback Equalizer (DFE) 30, for example.

The CTLE 28 is an amplifier circuit having a frequency characteristic that compensates the frequency characteristic of the transmission path, for example. With adjustment of the frequency characteristic, the CTLE 28 can finely shape the signal waveform.

The DFE 30 includes: a determiner (hereinafter, referred to as "sampler") that determines a logical value of the received signal; and a circuit (tap) that applies delay and weight to the sampled signal. The delay and weight applied to the sampled signal is adjusted by one or both of a tap coefficient and the tap number. The DFE 30 can finely compensate the received signal by adjusting the number of taps to increase the tap number, for example.

The adjustment circuit 24 is a circuit having a function of adjusting operation of the compensation circuit 22. The adjustment circuit 24 adjusts the frequency characteristic of the CTLE 28, and adjusts one or both of the tap coefficient and the tap number of the DFE 30, thereby adjusting the operation of the compensation circuit 22.

The adjustment circuit 24 sets an adjustment value that adjusts the operation of the compensation circuit 22 based on the training signal compensated by the compensation circuit 22. The adjustment circuit 24 detects an eye opening from an eye diagram based on the compensated training signal and then sets the adjustment value based on the detection result of the eye opening, for example.

Subsequently, the adjustment circuit 24 adjusts the frequency characteristic of the CTLE 28 in accordance with an adjustment value for adjusting the set CTLE 28, and then adjusts one or both of the tap coefficient and the tap number of the DFE 30 in accordance with the adjustment value for adjusting the set DFE 30, for example.

The processing circuit 26 is a circuit having a function of processing the data signal compensated by the compensation circuit 22. The processing circuit 26 includes a sampler and a processor that performs arbitrary processing on the sampled data signal, for example.

The reception device 20 included in a communication system using an existing multipoint bus has a configuration illustrated in FIG. 3, for example, and thereby performs calibration of the compensation circuit 22 using the received training signal and processes data signal after calibration.

Accordingly, a communication system using an existing multipoint bus prevents signal quality degradation due to the difference in the transmission path impedance and the delay amount between individual transmission devices and the reception device.

However, the reception device 20 needs to calibrate the compensation circuit 22 using the received training signal every time the transmission device that transmits the data signal is switched. Because of this, a communication system using an existing multipoint bus takes time to switch the transmission device that transmits the data signal, leading to reduction of the total bandwidth usable for transmission of the data signal in a certain period.

[2] Method for Improving Signal Transmission Efficiency in the Communication System 1000 According to the Present Embodiment In consideration of the above, in the communication system 1000, the reception device 200 does not calibrate the compensation circuit every time the transmission device 100 that transmits a data signal is switched. Instead, a compensation circuit (described below) included in the reception device 200 is calibrated using the adjustment value stored in the recording medium.

The adjustment value according to the present embodiment includes an adjustment value for adjusting the operation of the compensation circuit, for example. Hereinafter, among the adjustment values according to the present embodiment, the adjustment value for adjusting the operation of the compensation circuit will be referred to as "a first adjustment value" in some cases.

Examples of the first adjustment value (adjustment value for adjusting the operation of the compensation circuit) according to the present embodiment include an adjustment value for waveform correction in the reception device 200. Examples of adjustment value for waveform correction include one or both of a value for performing capacitance/resistance adjustment (high frequency boost amount) included in the CTLE and a value for setting the number of stages of DFE taps. The first adjustment value may be either an adjustment value itself of an equalizer for waveform correction, such as a value indicating the number of stages of DFE taps, or a value associated with the adjustment value on a table or the like (for example, an ID). The example of the first adjustment value is not limited to the above example. For example, in a case where the reception device 200 has a function of performing DeSkew adjustment, the first adjustment value may include a value for performing delay setting in a Programmable Delay Controller (PDC). The value for performing the delay setting in the PDC can be specified based on a value indicating the Bit Error Rate (BER) of the sampled signal, for example. Execution of DeSkew adjustment enables setting of more suitable phase value of the clock signal CLK.

The adjustment value according to the present embodiment is not limited to the first adjustment value (adjustment value for adjusting the operation of the compensation circuit). For example, the adjustment value according to the present embodiment may include an adjustment value that adjusts the operation of the transmission device 100. That is, the reception device 200 can also adjust the operation of the transmission device 100. Hereinafter, among the adjustment values according to the present embodiment, the adjustment value that adjusts the operation of the transmission device 100 will be referred to as "a second adjustment value" in some cases.

Examples of the second adjustment value (adjustment value that adjusts the operation of the transmission device 100) according to the present embodiment include an adjustment value of a Finite Impulse Response (FIR) filter included in the transmission device 100. An example of the adjustment value of the FIR filter is a value for setting the number of stages of the FIR filter taps. Note that the example of the second adjustment value is not limited to the example illustrated above.

Similarly to the adjustment value in the communication system using an existing multipoint bus described with reference to FIGS. 2 and 3, the adjustment value according to the present embodiment is set on the basis of a detection result from an eye opening, detected from an eye diagram based on the training signal transmitted from the transmission device 100. Since the adjustment value is set based on the training signal, the value is set for each of the transmission devices 100 that transmit the training signal. An example of the process related to the setting of the adjustment value will be described below. The adjustment value according to the present embodiment may be a value set at the manufacture of the reception device 200.

Examples of the recording medium to store the adjustment value can be a recording medium included in the reception device 200 or a recording medium external to the reception device 200 from which data can be read by the reception device 200.

Processes such as "a process of setting an adjustment value based on the training signal", "a process of recording the set first adjustment value (adjustment value for adjusting the operation of the compensation circuit) in a recording medium", and "a process of reading the first adjustment value from the recording medium to adjust the operation of the compensation circuit" are performed by an adjustment circuit (described below) included in the reception device 200. Furthermore, in a case where the reception device 200 has a function of adjusting the operation of the transmission device 100, a process of adjusting the operation of the transmission device 100 by using a second adjustment value (adjustment value that adjusts the operation of the transmission device 100) is performed by an adjustment circuit (described below) included in the reception device 200. In addition, a part of the setting process, the recording process, and the adjustment process may be performed by a circuit separate from an adjustment circuit (described below).

In the communication system 1000, the training signal is transmitted in time division from each of the transmission devices 100 in the period (first period) involving no data signal transmission.

An example of the period involving no data signal transmission in the communication system 1000 according to the present embodiment includes an invalid data period in which an adjustment value can be set based on the training signal (invalid data period in which the training time can be ensured). Specific examples of the period involving no data signal transmission include "a predetermined period set from the time when power supply to each of devices of the communication system 1000 is started (so-called point of power-on)" and "a vertical blanking period (V blank)".

Figure 4:
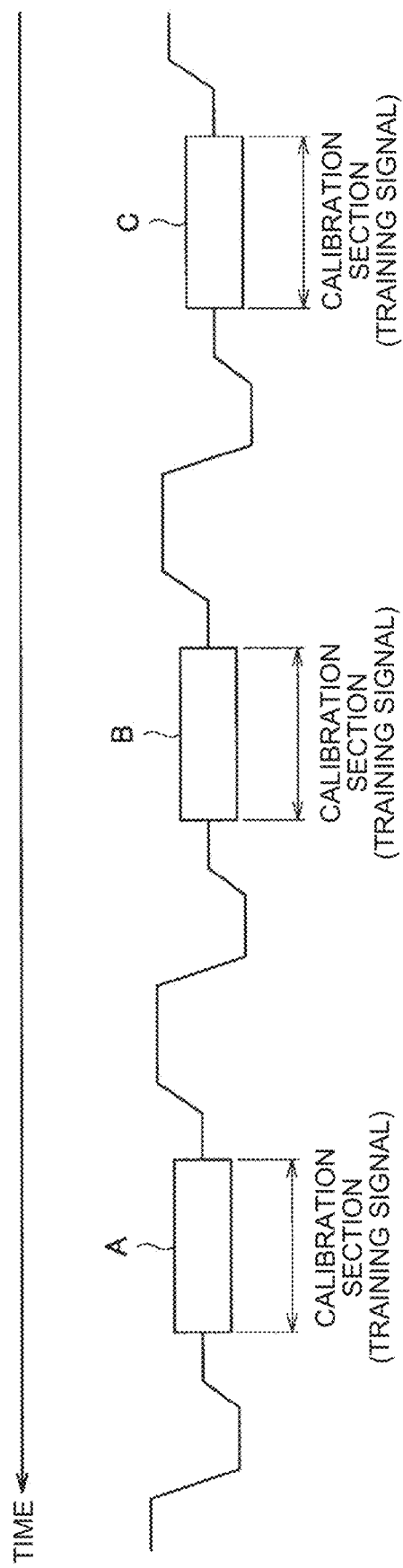
FIG. 4 is a diagram illustrating an example of training signal transmission in the communication system according to the present embodiment.

FIG. 4 is a diagram illustrating an example of training signal transmission in the communication system 1000 according to the present embodiment. The sign A illustrated in FIG. 4 indicates an example of the training signal transmitted by the transmission device 100A, for example. The sign B illustrated in FIG. 4 indicates an example of the training signal transmitted by the transmission device 100B, for example. The sign C illustrated in FIG. 4 indicates an example of the training signal transmitted by the transmission device 100C, for example.

As illustrated in FIG. 4, in the communication system 1000, a training signal is transmitted from each of the transmission devices 100 in time division, for example. Although FIG. 4 illustrates an example in which the training signals are sequentially transmitted in the order from the transmission device 100 having a shorter communication distance with the reception device 200 in a multipoint bus, the order of the transmission devices 100 that transmit the training signals is not limited to the example illustrated above. For example, it is allowable, in the communication system 1000, that the training signals are transmitted in any order that enables the transmission of the training signals in time division.

The reception device 200 that receives the training signal transmitted from each of the transmission devices 100 in time division sets an adjustment value ("first adjustment value" or "first adjustment value and second adjustment value") based on the received training signal every time the reception device 200 receives the training signal. That is, for example, as illustrated as "a calibration section" in FIG. 4, the section corresponding to the training signal corresponds to the period for setting the adjustment value based on the training signal.

In the communication system 1000, the data signal is transmitted in time division from each of the transmission devices 100, similarly to the communication system using an existing multipoint bus described with reference to FIGS. 2 and 3, for example.

Figure 5:
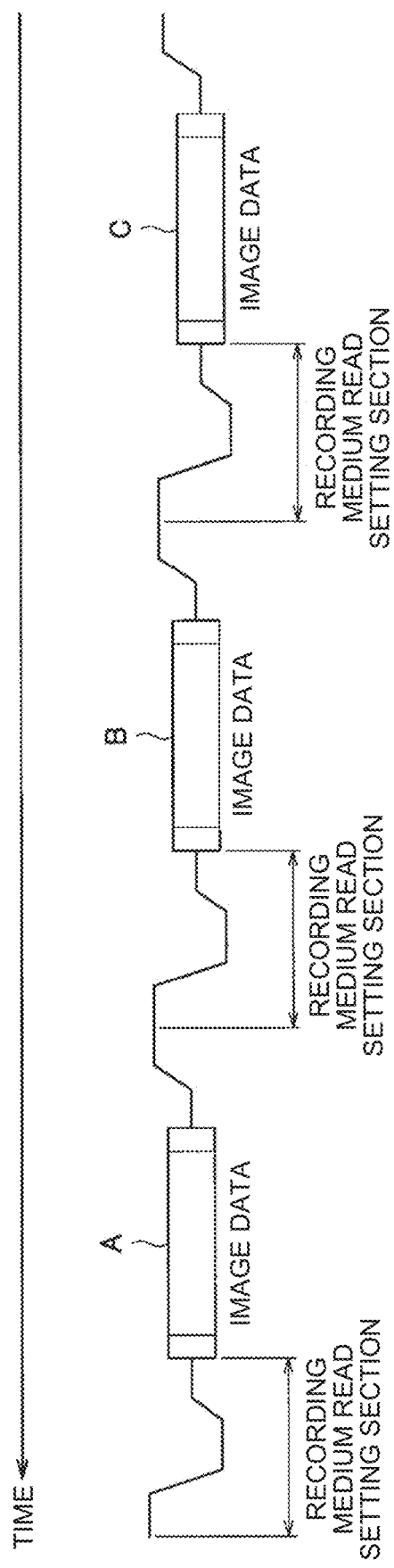
FIG. 5 is a diagram illustrating an example of data signal transmission in the communication system according to the present embodiment.

FIG. 5 is a diagram illustrating an example of data signal transmission in the communication system 1000 according to the present embodiment. The sign A illustrated in FIG. 5 indicates an example of the data signal transmitted by the transmission device 100A, for example. The sign B illustrated in FIG. 5 indicates an example of the data signal transmitted by the transmission device 100B, for example. The sign C illustrated in FIG. 5 indicates an example of the data signal transmitted by the transmission device 100C, for example. FIG. 5 illustrates an example in which each of the transmission devices 100 transmits a signal indicating image data, as a data signal.

The reception device 200, which receives the data signals transmitted from each of the transmission devices 100 in time division, reads the first adjustment value (adjustment value for adjusting the operation of the compensation circuit) from the recording medium in a period corresponding to the section indicated as "a recording medium read setting section" in FIG. 5, for example. Subsequently, the reception device 200 adjusts the operation of the compensation circuit by using the first adjustment value read from the recording medium.

Here, the period corresponding to the section indicated as "the recording medium read setting section" in FIG. 5 corresponds to the period (second period) before reception of the data signal transmitted from the transmission device 100, for example. That is, the reception device 200 is capable of reading the first adjustment value (adjustment value for adjusting the operation of the compensation circuit) from the recording medium in the period before reception of the data signal transmitted from the transmission device 100.

Note that the timing at which the reception device 200 reads the first adjustment value (the adjustment value for adjusting the operation of the compensation circuit) from the recording medium is not limited to the example illustrated with reference to FIG. 5.

For example, the reception device 200 is capable of reading the first adjustment value (adjustment value for adjusting the operation of the compensation circuit) from the recording medium in a case where a predetermined read timing is detected.

Examples of the predetermined read timing according to the present embodiment include the following timings. Note that the example of the predetermined read timing is not limited to the example illustrated below.

- Timing of detection of switching to a predetermined operation mode such as a Low Power (LP) mode in the MIPI Alliance D-PHY standard;
- Timing when a counter value of an internal counter of the reception device 200 based on the reception of a synchronization signal (vertical synchronization signal, horizontal synchronization signal, etc.) reaches a predetermined value;
- Timing of reception of a known code;
- Timing of detection of an end of the transmission of the data signal in the transmission device 100 transmitting the data signal; and
- Timing of detection of the start of the data signal transmission in the transmission device 100 that transmits a data signal subsequent to the transmission device 100 currently transmitting a data signal.

For example, operation of the compensation circuit is adjusted in the period corresponding to the section indicated as "the recording medium read setting section" in FIG. 5 by using the first adjustment value (adjustment value for adjusting the operation of the compensation circuit) read from the recording medium, whereby the compensation circuit is calibrated in the reception device 200. Furthermore, the reception device 200 processes the data signal received after the calibration.

Furthermore, for example, the operation of the transmission device 100 is adjusted by using the second adjustment value (adjustment value that adjusts the operation of the transmission device 100), whereby the reception device 200 can process the data signal transmitted by the adjusted transmission device 100.

Accordingly, the communication system 1000 can prevent signal quality degradation due to the difference in the transmission path impedance and the delay amount between the individual transmission devices 100 and the reception device 200.

In addition, the reception device 200 included in the communication system 1000 does not perform "a calibration of the compensation circuit executed every time the transmission device that transmits the data signal is switched, which is performed by the reception device 20 included in a communication system using an existing multipoint bus". Accordingly, the communication system 1000 including the reception device 200 makes it possible to improve the signal transmission efficiency as compared with the communication system using an existing multipoint bus.

Consequently, the presence of the reception device 200 makes it possible to achieve "a communication system capable of preventing signal quality degradation and improving signal transmission efficiency in a case where a data signal is transmitted via a transmission line connecting the plurality of transmission devices 100 and the reception device 200".

[3] Example of Configuration of the Reception Device 200 According to the Present Embodiment Next, an example of a configuration and a process of the reception device 200 will be described.

Figure 6:
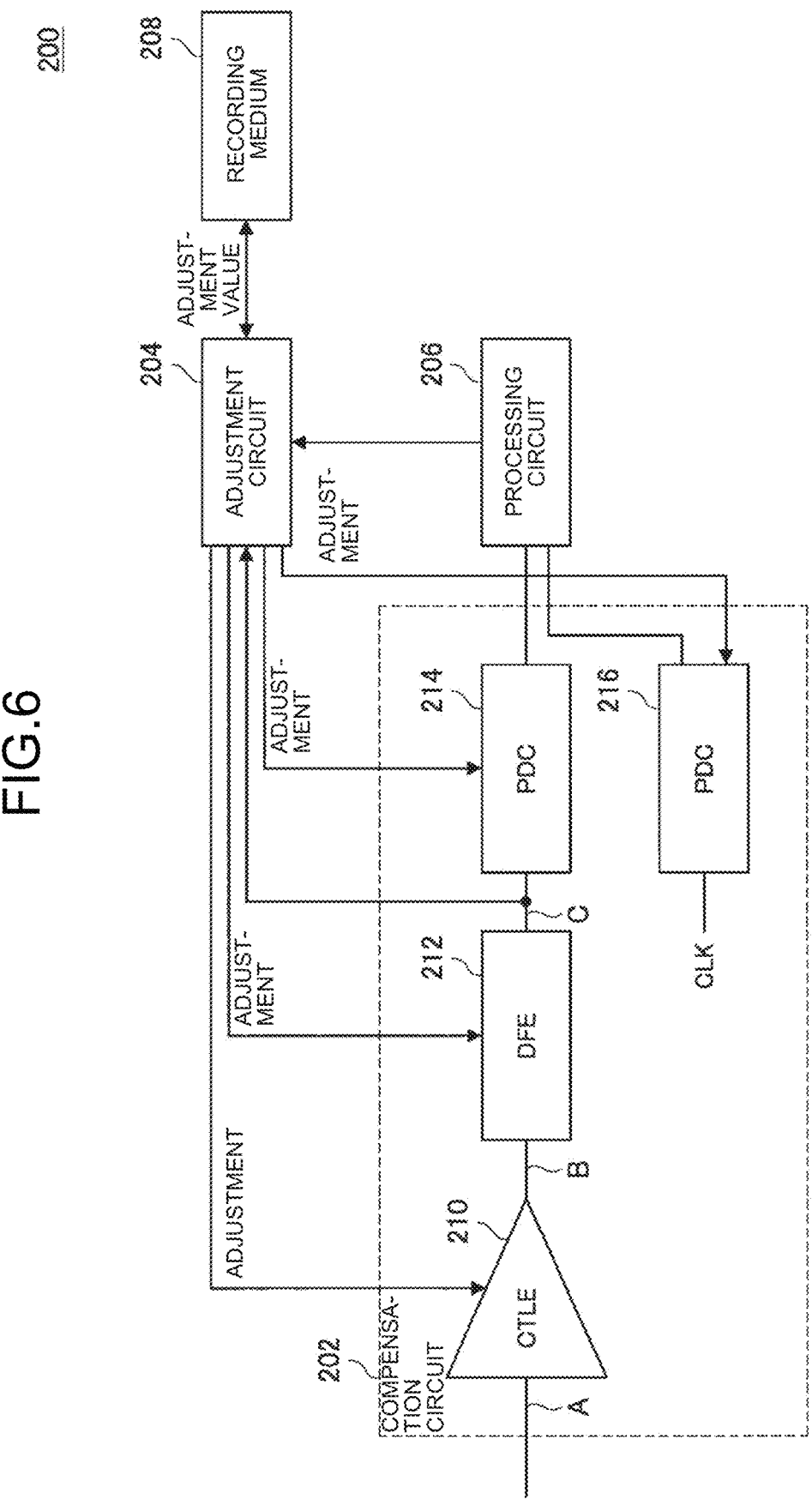
FIG. 6 is a block diagram illustrating an example of a configuration of a reception device included in the communication system according to the present embodiment.
Figure 7A:
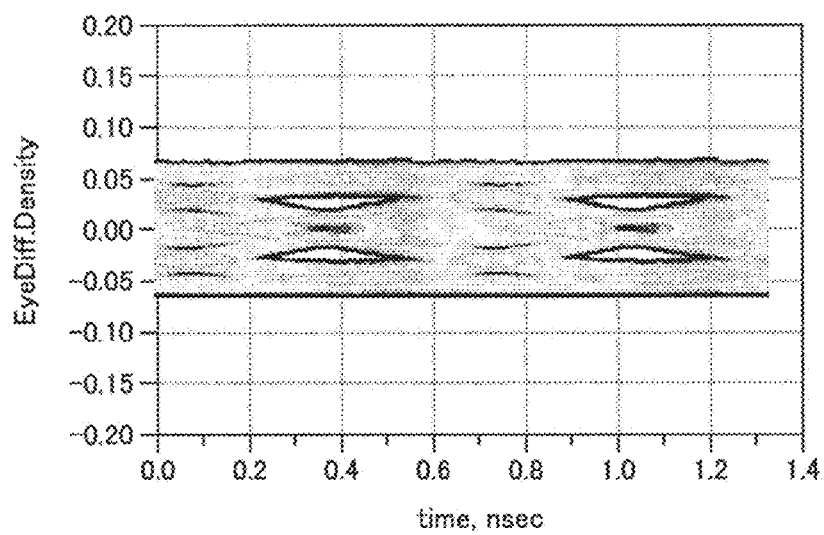
FIGS. 7A, 7B, and 7C are diagrams illustrating an example of a signal waveform processed in the reception device according to the present embodiment.
Figure 7B:
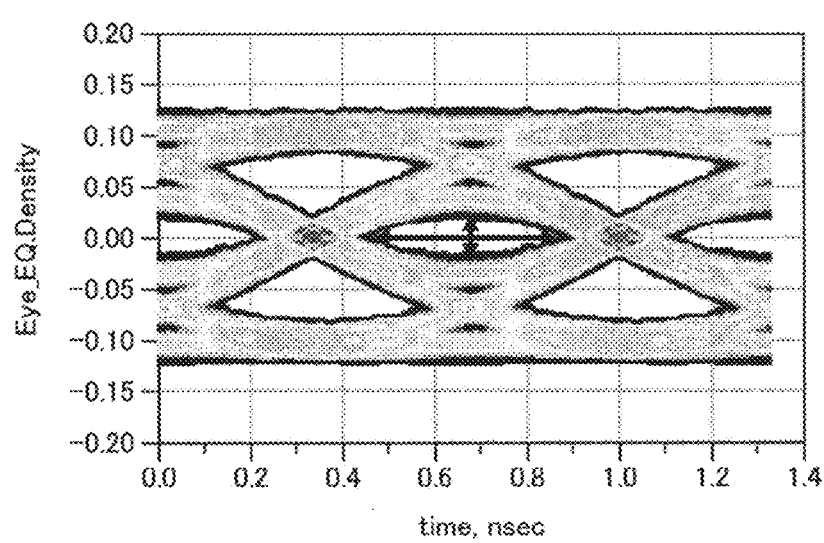
Figure 7C:
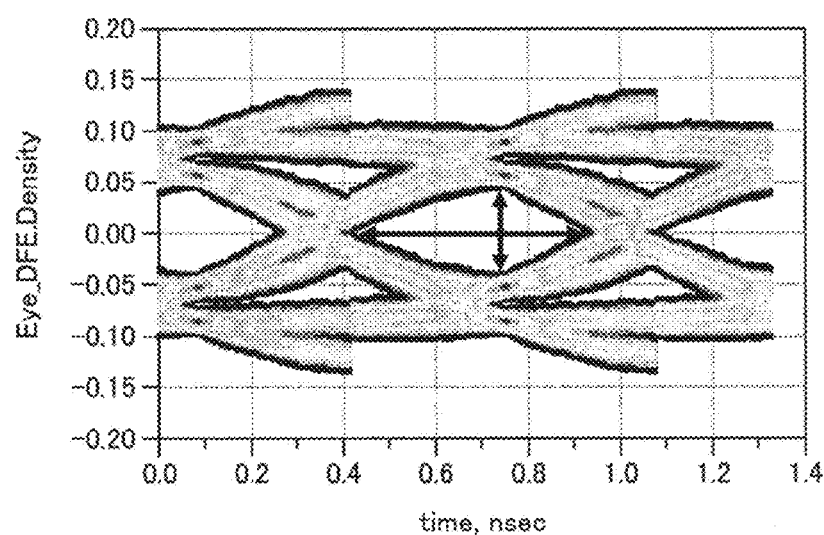

FIG. 6 is a block diagram illustrating an example of a configuration of the reception device 200 included in the communication system 1000 according to the present embodiment. FIGS. 7A, 7B, and 7C are diagrams illustrating an example of a signal waveform processed by the reception device 200 according to the present embodiment, in which the signal waveform is represented by an eye diagram. The signal waveforms illustrated in FIGS. 7A, 7B, and 7C are examples of the signal waveforms of the signal at A of FIG. 6, B of FIG. 6, and C of FIG. 6, respectively.

The reception device 200 includes a compensation circuit 202, an adjustment circuit 204, a processing circuit 106, and a recording medium 208, for example.

[3-1] Compensation Circuit 202

The compensation circuit 202 is a circuit having a function of compensating a received signal. The compensation circuit 202 includes a CTLE 210, a DFE 212, a PDC 214, and a PDC 216, for example.

The CTLE 210 and the DFE 212 respectively compensate signals similarly to CTLE 28 and DFE 30 included in compensation circuit 22 illustrated in FIG. 3. As illustrated in FIGS. 7B and 7C, it is observed that compensation of the signal in the compensation circuit 202 has widened the eye opening, indicating improvement in the signal receiving characteristic.

The PDC 214 delays the signal transmitted from the DFE 212 in accordance with the delay setting. The PDC 216 delays the clock signal CLK in accordance with the delay setting. The presence of the PDC 214 and the PDC 216 enables the reception device 200 to perform DeSkew adjustment. In a case where the reception device 200 does not have the function of performing DeSkew adjustment, the compensation circuit 202 does not have to include the PDC 214 and the PDC 216.

[3-2] Adjustment Circuit 204

The adjustment circuit 204 is a circuit having a function of adjusting the operation of the compensation circuit 202.

Similarly to the adjustment circuit 24 illustrated in FIG. 3, for example, the adjustment circuit 204 adjusts the frequency characteristic of the CTLE 210 and adjusts one or both of the tap coefficient and the tap number of the DFE 212, thereby adjusting the operation of the compensation circuit 202. Furthermore, the adjustment circuit 204 adjusting the delay settings of the PDC 214 and PDC 216, individually, thereby adjusting the operation of the compensation circuit 202.

Here, the adjustment circuit 24 illustrated in FIG. 3 sets the adjustment value that adjusts the operation of the compensation circuit 22 based on the training signal compensated in the compensation circuit 22. In contrast, the adjustment circuit 204 adjusts the operation of the compensation circuit 202 by using the first adjustment value (adjustment value for adjusting the operation of the compensation circuit 202) read from the recording medium 208.

More specifically, the adjustment circuit 204 reads, from the recording medium 208, the first adjustment value (adjustment value for adjusting the operation of the compensation circuit 202) corresponding to the transmission device 100 that transmits the data signal. Subsequently, the adjustment circuit 204 adjusts the frequency characteristic of the CTLE 210 in accordance with the first adjustment value corresponding to the read CTLE 210, while adjusting one or both of the tap coefficient and the tap number of the DFE 212 in accordance with the first adjustment value corresponding to the read DFE 212. Furthermore, the adjustment circuit 204 adjusts the delay settings of PDC 214 and PDC 216 in accordance with the first adjustment value corresponding to the read PDC 214 and PDC 216, respectively, for example.

In a case where the above-described predetermined read timing is detected, the adjustment circuit 204 reads, from the recording medium 208, a first adjustment value (adjustment value for adjusting the operation of the compensation circuit 202) corresponding to the transmission device 100 that transmits the data signal.

Note that process in the adjustment circuit 204 is not limited to the above example.

For example, the adjustment circuit 204 is also capable of adjusting the operation of the transmission device 100 based on the second adjustment value (adjustment value that adjusts the operation of the transmission device 100).

More specifically, the adjustment circuit 204 sets a second adjustment value (adjustment value that adjusts the operation of the transmission device 100) based on a training signal transmitted from the transmission device 100 in a period (first period) involving no data signal transmission. Subsequently, the adjustment circuit 204 adjusts the operation of the transmission device based on the second adjustment value. For example, the adjustment circuit 204 adjusts the operation of the transmission device 100 by "controlling to record the second adjustment value onto the recording medium such as a register included in the transmission device 100 via a communication path capable of bidirectional communication such as an Inter-Integrated Circuit (I2C) bus", or the like. Note that the adjustment example of the operation of the transmission device 100 in the adjustment circuit 204 is not limited to the above example. Furthermore, the adjustment circuit 204 can adjust the operation of the transmission device 100 at any timing, not limited to the period involving no data signal transmission.

Furthermore, the adjustment circuit 204 may set the first adjustment value (adjustment value for adjusting the operation of the compensation circuit 202) based on the training signal transmitted from each of the transmission devices 100 as illustrated in FIG. 4, for example, and may record the set adjustment value onto the recording medium 208.

The adjustment circuit 204 can also record the adjustment value acquired from the transmission device 100 onto the recording medium 208, for example. Here, the adjustment circuit 204 acquires the adjustment value from the transmission device 100 via a certain communication path, for example, a communication path capable of bidirectional communication, such as an I2C bus.

[3-3] Processing Circuit 206

The processing circuit 206 is a circuit having a function of processing the data signal compensated by the compensation circuit 202. The processing circuit 206 includes a sampler and a processor that performs arbitrary processing on the sampled data signal, similar to the processing circuit 26 illustrated in FIG. 3, for example.

Furthermore, in a case where the reception device 200 has a function of performing DeSkew adjustment, the processing circuit 206 transmits a data signal corresponding to the training signal or a result of BER determination based on the data signal (for example, a value indicating BER) to the adjustment circuit 204, for example. In a case where the data signal corresponding to the training signal is transmitted, the adjustment circuit 204 performs BER determination, for example, and sets the first adjustment value corresponding to the PDC 214 and PDC 216 individually, based on the result of the BER determination. Furthermore, in a case where the result of the BER determination is transmitted, the adjustment circuit 204 sets the first adjustment value corresponding to the PDC 214 and PDC 216 individually, based on the result of the BER determination. Subsequently, the adjustment circuit 204 records the first adjustment value corresponding to the PDC 214 and PDC 216 individually, onto the recording medium 208.

[3-4] Recording Medium 208

The recording medium 208 is a recording medium included in the reception device 200.

The recording medium 208 stores the first adjustment value (adjustment value for adjusting the operation of the compensation circuit 202) corresponding to each of the transmission devices 100, for example. The first adjustment value stored in the recording medium 208 may be a value stored in advance at any timing such as at the manufacture of the reception device 200 or may be a value recorded by the adjustment circuit 204.

The data recorded onto the recording medium 208 is not limited to the data indicating the first adjustment value, and any data can be stored in the recording medium 208.

Here, examples of the recording medium 208 include non-volatile memory such as a flash drive, or a magnetic recording medium such as a hard disk. Furthermore, the recording medium 208 may be detachable from the reception device 200.

The reception device 200 included in the communication system 1000 has a configuration illustrated in FIG. 6, for example.

Here, in the reception device 200, the operation of the compensation circuit 202 is adjusted by the first adjustment value (adjustment value for adjusting the operation of the compensation circuit 202) read from the recording medium 208, and then calibration of the compensation circuit 202 is performed. That is, the reception device 200 does not perform "a calibration of the compensation circuit executed every time the transmission device that transmits the data signal is switched, which is performed the reception device 20 included in a communication system using an existing multipoint bus".

Accordingly, the communication system 1000 including the reception device 200 makes it possible to improve the signal transmission efficiency as compared with the communication system using an existing multipoint bus.

Furthermore, with execution of calibration of the compensation circuit 202 as described above, the processing circuit 206 included in the reception device 200 processes the data signal received after the calibration.

Furthermore, the reception device 200 can adjust the operation of the transmission device 100 by using the second adjustment value (adjustment value that adjusts the operation of the transmission device 100). Accordingly, the reception device 200 can receive the data signal transmitted by the adjusted transmission device 100 and process the received data signal.

Accordingly, the communication system 1000 having the reception device 200 can prevent signal quality degradation due to the difference in the transmission path impedance and the delay amount between the individual transmission devices 100 and the reception device 200.

Consequently, with the presence of the reception device 200 having the configuration illustrated in FIG. 6, for example, it is possible to achieve "a communication system capable of preventing signal quality degradation and improving signal transmission efficiency in the case where a data signal is transmitted via a transmission line connecting the plurality of transmission devices 100 and the reception device 200".

The configuration of the reception device according to the present embodiment is not limited to the example illustrated in FIG. 6.

For example, in a case where it is possible to read the adjustment value stored in an external recording medium, the reception device according to the present embodiment does not have to include the recording medium 208 illustrated in FIG. 6.

Furthermore, for example, in a case where a signal received by the reception device 200 is processed by an external processing circuit having the function similar to the processing circuit 206 illustrated in FIG. 6, the reception device according to the present embodiment does not have to include the processing circuit 206 illustrated in FIG. 6. Even with a configuration not including the processing circuit 206, it is possible to apply the above-described "method for improving the signal transmission efficiency in the communication system according to the present embodiment" to the reception device according to the present embodiment. Accordingly, even with the configuration not including the processing circuit 206, the reception device according to the present embodiment can achieve effects similar to the reception device 200 illustrated in FIG. 6.

[4] Example of a Process in the Communication System 1000 According to the Present Embodiment Next, as an example of process in the communication system 1000 according to the present embodiment, an example of the process related to the setting of an adjustment value based on a training signal will be described. As described with reference to FIG. 4, in the communication system 1000, the training signal is transmitted from the transmission device 100 in time division.

Figure 8A:
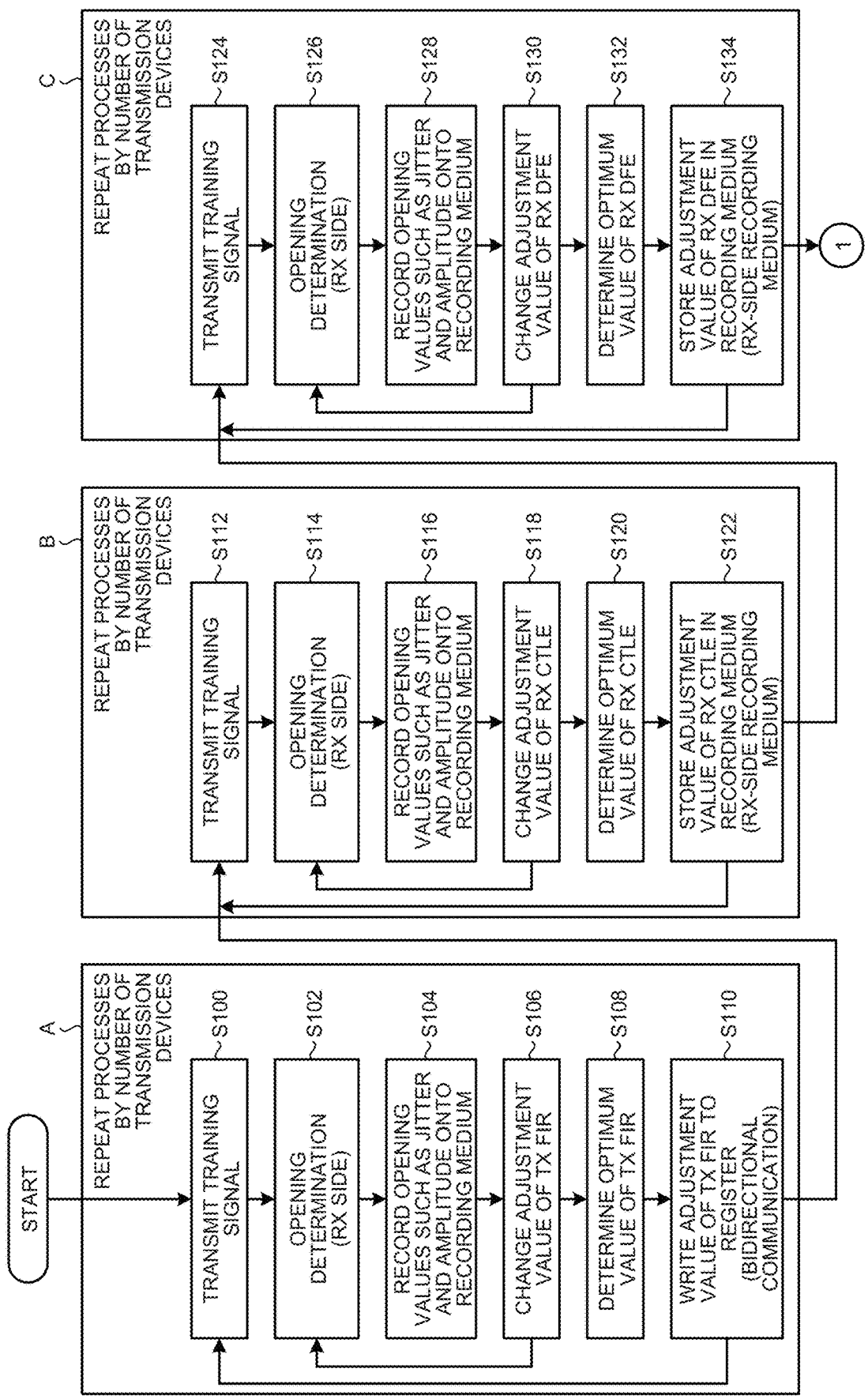
FIG. 8A is a flowchart illustrating an example of a process in the communication system according to the present embodiment.

FIGS. 8A and 8B are flowcharts each illustrating an example of a process in the communication system 1000 according to the present embodiment, illustrating an example of a process related to the setting of an adjustment value based on a training signal.

A series of processes illustrated in A of FIG. 8A is an example of "a process related to the setting of the second adjustment value (adjustment value that adjusts the operation of the transmission device 100) and related to the adjustment of the operation of the transmission device 100". A series of processes illustrated in B of FIG. 8A is a first example of "a process related to the setting of the first adjustment value (adjustment value for adjusting operation of compensation circuit 202) and related to the adjustment of operation of compensation circuit 202". A series of processes illustrated in C of FIG. 8A is a second example of "a process related to the setting of the first adjustment value and related to the adjustment of the operation of the compensation circuit 202". A series of processes illustrated in D of FIG. 8B is a third example of "a process related to the setting of the first adjustment value and related to the adjustment of the operation of the compensation circuit 202". The series of processes illustrated in A of FIG. 8A, the series of processes illustrated in B of FIG. 8A, the series of processes illustrated in C of FIG. 8A, and the series of processes illustrated in D of FIG. 8B are each repeated by the number of transmission devices 100.

[4-1] Example of "a Process Related to the Setting of the Second Adjustment Value and Related to the Adjustment of Operation of Transmission Device 100" (A of FIG. 8A)

The transmission device 100 transmits a training signal (S100).

After receiving the training signal transmitted from transmission device 100 in step S100, the reception device 200 detects an eye opening from an eye diagram based on the training signal and performs opening determination (S102). The reception device 200 records opening values (jitter, amplitude, or the like) obtained as a result of the process of step S102 onto the recording medium 208 (S104). Furthermore, the reception device 200 changes the adjustment value of the FIR filter of the transmission device 100 (S106) based on the opening values obtained as a result of the process of step S102. The reception device 200 repeats the processes of steps S102 to S106 during reception of the training signal.

After completion of reception of the training signal transmitted from the transmission device 100 in step S100, the reception device 200 determines an optimum value of the FIR filter of the transmission device 100 (S108). The optimum value determined in step S108 corresponds to the second adjustment value (adjustment value that adjusts the operation of the transmission device 100) corresponding to the transmission device 100 that has transmitted the training signal in step S100.

The reception device 200 writes the optimum value determined in step S108 to a register included in the transmission device 100 via a communication path capable of bidirectional communication such as an I2C bus (S110). The process of step S110 corresponds to an example of a process of adjusting the operation of the transmission device 100 that has transmitted the training signal in step S100.

The communication system 1000 repeats the processes of steps S100 to S110 for the number of transmission devices 100, thereby adjusting the operation of the transmission device 100. Note that the example of the process of adjusting the operation of the transmission device 100 in the communication system 1000 is not limited to the processes of steps S100 to S110.

[4-2] First Example of "a Process Related to the Setting of the First Adjustment Value and Related to the Adjustment of Operation of the Compensation Circuit 202"

The transmission device 100 transmits a training signal (S112).

After receiving the training signal transmitted from the transmission device 100 in step S112, the reception device 200 detects an eye opening from an eye diagram based on the training signal and performs opening determination (S114). The reception device 200 records opening values (jitter, amplitude, or the like) obtained as a result of the process of step S114 onto the recording medium 208 (S116). Furthermore, the reception device 200 changes the adjustment value of the CTLE 210 (S118) based on the opening values obtained as a result of the process of step S114. The reception device 200 repeats the processes of steps S112 to S118 during reception of the training signal.

After completion of reception of the training signal transmitted from the transmission device 100 in step S112, the reception device 200 determines an optimum value of the CTLE 210 (S120). The optimum value determined in step S120 corresponds to the first example of the first adjustment value (adjustment value for adjusting the operation of the compensation circuit 202) corresponding to the transmission device 100 that has transmitted the training signal in step S112.

The reception device 200 records the optimum value of the CTLE 210 determined in step S120 onto the recording medium 208 (S122).

In the communication system 1000, the processes of steps S112 to S122 are repeatedly performed for the number of transmission devices 100, whereby the first adjustment value (adjustment value for adjusting the operation of the compensation circuit 202) corresponding to the CTLE 210 is recorded onto the recording medium 208 for each of the transmission devices 100. Note that the example of the process related to the setting of the first adjustment value corresponding to the CTLE 210 in the communication system 1000 is not limited to the processes of steps S112 to S122.

[4-3] Second Example of "a Process Related to the Setting of the First Adjustment Value and Related to the Adjustment of Operation of the Compensation Circuit 202"

The transmission device 100 transmits a training signal (S124).

After receiving the training signal transmitted from transmission device 100 in step S124, the reception device 200 detects an eye opening from an eye diagram based on the training signal and performs opening determination (S126). The reception device 200 records opening values (jitter, amplitude, or the like) obtained as a result of the process of step S126 onto the recording medium 208 (S128). Furthermore, the reception device 200 changes the adjustment value of the DFE 212 (S130) based on the opening values obtained as a result of the process of step S126. The reception device 200 repeats the processes of steps S126 to S130 during reception of the training signal.

After completion of reception of the training signal transmitted from the transmission device 100 in step S124, the reception device 200 determines an optimum value of the DFE 212 (S132). The optimum value determined in step S132 corresponds to the second example of the first adjustment value (adjustment value for adjusting the operation of the compensation circuit 202) corresponding to the transmission device 100 that has transmitted the training signal in step S124.

The reception device 200 records the optimum value of the DFE 212 determined in step S132 onto the recording medium 208 (S134).

In the communication system 1000, the processes of steps S124 to S134 are repeatedly performed for the number of transmission devices 100, whereby the first adjustment value (adjustment value for adjusting the operation of the compensation circuit 202) corresponding to the DFE 212 is recorded onto the recording medium 208 for each of the transmission devices 100. Note that the example of the process related to the setting of the first adjustment value corresponding to the DFE 212 in the communication system 1000 is not limited to the processes of steps S124 to S134.

[4-4] Third Example of "a Process Related to the Setting of the First Adjustment Value and Related to the Adjustment of Operation of the Compensation Circuit 202"

The transmission device 100 transmits a training signal (S136).

After receiving the training signal transmitted from the transmission device 100 in step S136, the reception device 200 performs BER determination (S138). The reception device 200 specifies a value for performing delay setting in PDC based on the value indicating the BER obtained as a result of the process in step S138 and then changes the adjustment values individually corresponding to PDC 214 and PDC 216 (S140). The reception device 200 repeats the processes of steps S138 and S140 during reception of the training signal.

After completion of reception of the training signal transmitted from the transmission device 100 in step S136, the reception device 200 determines individual optimum values of the PDC 214 and PDC 216 (S142). The optimum value determined in step S142 corresponds to the third example of the first adjustment value (adjustment value for adjusting the operation of the compensation circuit 202) corresponding to the transmission device 100 that has transmitted the training signal in step S136.

The reception device 200 records the individual optimum values of the PDC 214 and PDC 216 determined in step S142 onto the recording medium 208 (S144).

In the communication system 1000, the processes of steps S136 to S144 are repeatedly performed for the number of transmission devices 100, whereby the first adjustment values (adjustment values for adjusting the operation of the compensation circuit 202) individually corresponding to the PDC 214 and the PDC 216 is recorded onto the recording medium 208 for each of the transmission devices 100. Note that the example of the process related to the setting of the first adjustment values individually corresponding to the PDC 214 and the PDC 216 in the communication system 1000 is not limited to the processes of steps S136 to S144.

In the communication system 1000, as a result of the processes illustrated in FIGS. 8A and 8B, for example, the second adjustment value (adjustment value that adjusts the operation of the transmission device 100) is set based on the training signal, and then the first adjustment value (adjustment value for adjusting the operation of the compensation circuit 202) is set based on the training signal.

Note that the example of the process related to the setting of the adjustment value based on the training signal is not limited to the examples illustrated in FIGS. 8A and 8B. For example, although FIG. 8A illustrates an example of performing the series of processes illustrated in A of FIG. 8A, the series of processes illustrated in B of FIG. 8A, and the series of processes illustrated in C of FIG. 8A in this order, the processes may be performed in any order in the communication system 1000. Furthermore, in a case where the reception device 200 has no function of performing DeSkew adjustment, the communication system 1000 does not have to perform the series of processes illustrated in D of FIG. 8B.

[5] Example of Effects Obtained by Using the Communication System Including the Reception Device According to the Present Embodiment By using the communication system including the reception device according to the present embodiment, for example, the following effects will be obtained. Note that the effects obtained by using the communication system including the reception device according to the present embodiment are not limited to the example illustrated below.

In the communication system according to the present embodiment, an optimum value (first adjustment value) of the compensation circuit corresponding to each of the transmission devices is searched for in the reception device in the period involving no data signal transmission, such as at the start of power supply (so-called power-on point) to each of devices of the communication system, and the optimum value will be stored in the recording medium. Subsequently, at the time of switching the transmission device 100 that transmits the data signal, the reception device reads the optimum value corresponding to the transmission device from the recording medium and adjusts the operation of the compensation circuit. Accordingly, the communication system according to the present embodiment does not need to perform calibration for each of output switching times of each transmission device, leading to the reduction of the time taken for the switching time. This makes it possible to suppress the decrease in the total bandwidth of data signals that can be transmitted in a certain period.

[6] Application Example of Communication System, Transmission Device, and Reception Device According to the Present Embodiment As described above, the communication system has been described as the present embodiment, but the present embodiment is not limited to this mode. The present embodiment can be applied to various electronic devices including "a drone", mobile bodies such as "an automobile", various wearable devices worn on the user's body like "a head mounted display, eyeglass-type eyewear, a watch-type device, or a bracelet-type device", "communication devices such as a smartphone", "computers such as a personal computer (PC)", "tablet devices", "game machines", or the like.

Furthermore, although the transmission device has been described as a component of the communication system, the present embodiment is not limited to such a form. The present embodiment can be applied to various electronic devices capable of transmitting, via a transmission line, data according to their own functions, such as an image sensor, and motion sensors such as an acceleration sensor or an angular velocity sensor. In addition, the present embodiment may be a communication device that is connected to an external sensor device such as an image sensor or a motion sensor, for example, and configured to transmit data indicating a detection result of the sensor device via a transmission line.

Furthermore, although the reception device has been described as a component of the communication system, the present embodiment is not limited to such a form. The present embodiment can be applied, for example, to "a processing device such as a processor" and "any processing circuit or any device capable of processing the data output via a transmission line from each of a plurality of transmission devices connected to the transmission line".

The preferred embodiments of the present disclosure have been described in detail above with reference to the accompanying drawings, but the technical scope of the present disclosure is not limited to such examples. It is obvious that a person having ordinary knowledge in the technical field of the present disclosure can come up with various changes or modifications within the scope of the technical idea described in the claims, and these are understood, of course, to belong to the technical scope of the present disclosure.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

Note that the following configurations also belong to the technical scope of the present disclosure.

(1) A reception device comprising:
a compensation circuit connected to a transmission line connected to each of a plurality of transmission devices and configured to compensate a signal transmitted from each of the transmission devices in time division; and
an adjustment circuit configured to adjust operation of the compensation circuit,
wherein the adjustment circuit adjusts the operation of the compensation circuit by using a first adjustment value that adjusts the operation of the compensation circuit and is read from a recording medium storing the first adjustment value.

(2) The reception device according to (1), wherein the adjustment circuit sets the first adjustment value based on a training signal transmitted from each of the transmission devices, and records the set first adjustment value onto the recording medium.

(3) The reception device according to (2), wherein the training signal is transmitted in time division from each of the transmission devices in a first period involving no data signal transmission.

(4) The reception device according to any one of (1) to (3), wherein the adjustment circuit reads, from the recording medium, the first adjustment value corresponding to the transmission device that transmits a data signal, and adjusts the operation of the compensation circuit by using the read first adjustment value.

(5) The reception device according to (4), wherein the adjustment circuit reads the first adjustment value from the recording medium in a case where a predetermined read timing has been detected.

(6) The reception device according to (4) or (5), wherein the first adjustment value is read from the recording medium in a second period before reception of the data signal.

(7) The reception device according to any one of (1) to (6), wherein the adjustment circuit sets a second adjustment value that adjusts the operation of the transmission device based on a training signal transmitted from each of the transmission devices, and adjusts the operation of the transmission device based on the second adjustment value.

(8) A communication system comprising:
a plurality of transmission devices each connected to a transmission line; and a reception device connected to the transmission line and configured to receive a signal transmitted from each of the transmission devices,
wherein the reception device includes:
a compensation circuit connected to the transmission line and configured to compensate a signal transmitted from each of the transmission devices in time division; and
an adjustment circuit configured to adjust operation of the compensation circuit, and
the adjustment circuit adjusts the operation of the compensation circuit by using a first adjustment value that adjusts the operation of the compensation circuit and is read from a recording medium storing the first adjustment value.

REFERENCE SIGNS LIST 20, 200 RECEPTION DEVICE
22, 202 COMPENSATION CIRCUIT
24, 204 ADJUSTMENT CIRCUIT
26, 206 PROCESSING CIRCUIT
28, 210 CTLE
30, 212 DFE
100, 100A, 100B, 100C, 100D, 100E TRANSMISSION DEVICE
208 RECORDING MEDIUM
1000 COMMUNICATION SYSTEM

The invention claimed is:

1. A reception device comprising:
a compensation circuit connected to a transmission line connected to each of a plurality of transmission devices and configured to compensate a plurality of data signals received from the plurality of transmission devices, respectively, in time division; and
an adjustment circuit configured to:
read, from a recording medium, a first adjustment value based on a detection of a predetermined read timing, wherein the recording medium stores the first adjustment value; and
adjust operation of the compensation circuit based on the first adjustment value, wherein the first adjustment value adjusts the operation of the compensation circuit.

2. The reception device according to claim 1, wherein the adjustment circuit is further configured to set the first adjustment value for each of the plurality of transmission devices based on a plurality of training signals received from the plurality of transmission devices, respectively, and record the set first adjustment value for each of the plurality of transmission devices onto the recording medium.

3. The reception device according to claim 2, wherein the plurality of training signals is received in time division from the plurality of transmission devices in a first period involving no data signal transmission.

4. The reception device according to claim 1, wherein the first adjustment value corresponds to a transmission device of the plurality of transmission devices from which a data signal of the plurality of data signals is received.

5. The reception device according to claim 4, wherein the first adjustment value is read from the recording medium in a second period before reception of the data signal.

6. The reception device according to claim 1, wherein the adjustment circuit is further configured to set a second adjustment value that adjusts the operation of a transmission device of the plurality of transmission devices based on a training signal received from the transmission device, and adjust the operation of the transmission device based on the second adjustment value.

7. A communication system comprising:
a plurality of transmission devices each connected to a transmission line; and
a reception device connected to the transmission line and configured to receive a plurality of data signals from the plurality of transmission devices, respectively, in time division,
wherein the reception device includes:
a compensation circuit connected to the transmission line and configured to compensate the plurality of data signals received from the plurality of transmission devices, respectively, in time division; and
an adjustment circuit configured to:
read, from a recording medium, a first adjustment value based on a detection of a predetermined read timing, wherein the recording medium stores the first adjustment value; and
adjust operation of the compensation circuit based on the first adjustment value, wherein the first adjustment value adjusts the operation of the compensation circuit.

8. The reception device according to claim 4, wherein the predetermined read timing corresponds to a timing of detection of a start of transmission of the data signal by the transmission device.

9. The reception device according to claim 4, wherein the predetermined read timing corresponds to a timing of detection of an end of transmission of the data signal by the transmission device.

10. The reception device according to claim 1, wherein the predetermined read timing corresponds to a timing of reception of a known code by the reception device.

* * * * *